United States Patent [19]

Fisher et al.

[11] 4,285,058
[45] Aug. 18, 1981

[54] WAVEFORM CORRECTION BY SAMPLING

[76] Inventors: Charles B. Fisher, 2850 Hill Park Rd., Montreal, Quebec H3H 1T1, Canada; Sidney T. Fisher, 53 Morrison Ave., Mt. Royal, Montreal, Quebec H3R 1K3, Canada

[21] Appl. No.: 124,803

[22] Filed: Feb. 26, 1980

[51] Int. Cl.³ .................. H04J 15/00; H04B 1/76
[52] U.S. Cl. ................................ 370/119; 370/74; 455/70
[58] Field of Search ............... 370/119, 118, 110, 98, 370/76, 74; 455/70, 72, 295, 296

[56] References Cited

U.S. PATENT DOCUMENTS

| | | | |
|---|---|---|---|
| 2,974,224 | 3/1961 | Ule | 370/74 |
| 3,582,788 | 6/1971 | Castagna | 455/70 |
| 3,974,447 | 8/1976 | Löfmark | 370/74 |
| 4,009,350 | 2/1977 | Cabet et al. | 370/74 |
| 4,034,296 | 7/1977 | Berenson et al. | 370/74 |

OTHER PUBLICATIONS

*Transmission Systems for Communications*, Bell Telephone Laboratories, 1971, pp. 654 & 655.
*Reference Data for Radio Engineers*, Howard W. Sams, 1969, pp. 15-1 to 15-13.

*Primary Examiner*—Douglas W. Olms

[57] ABSTRACT

A system which automatically corrects the wave-form of a signal of a given frequency passing over a transmission path, over which a carrier double-sideband amplitude-modulated by a complex tone and extending across the given signal-frequency band is transmitted in the signal-frequency band as a combined wave with the signal. At the receiving apparatus the reconstructed modulated carrier is used as a standard to correct the waveform of the signal from distortion caused by the transmission path, using sampling, reconstruction, comparison and gain-variation methods. The modulated carrier is eliminated from the corrected signal at the output of the receiving apparatus by sampling and reconstruction methods. Sampling and modulation frequencies and phases are derived from the carrier.

2 Claims, 2 Drawing Figures

WAVEFORM CORRECTION BY SAMPLING

BACKGROUND OF THE INVENTION

This invention relates to automatic correction of waveform distortion over a transmission path.

Automatic control of flat gain and automatic control of frequency response across a band are well known in the prior art. Means for continuous automatic control of frequency response and delay simultaneously across a band, so as to correct waveform distortion as in this invention, is not disclosed in the prior art. We do not know of any relevant prior art.

BRIEF DESCRIPTION OF THE INVENTION

A continuous automatic waveform correction system, in which a periodic pilot, consisting of a constant-frequency carrier double-sideband amplitude modulated by a complex wave, extends over the signal frequency band of the tranmission system and is transmitted simultaneously with the signal. The pilot carrier frequency is approximately centered on the signal frequency band, is greater than the signal frequency band, and as received is greater than one-half the minimum sampling or Nyquist frequency of the signal frequency band.

At the receiving apparatus the combined pilot and signal in the signal frequency band are passed through a variable gain device with its output a linear function of its input and of the voltage supplied to a control lead. The output of the variable gain device passes through a band-pass filter passing the signal frequency band and emerges with the signal waveform and the pilot waveform substantially corrected to be the same as at the transmitting apparatus output. Either by direct subtraction or by sampling and reconstruction means the signal is subtracted from the pilot plus signal, to obtain the pilot, all with substantially corrected waveforms, at the output of the band-pass filter. A pilot carrier selection circuit obtains the pilot carrier, substantially free from sidebands and signal, which is used to generate a pilot identical to the pilot as transmitted, and the received pilot, substantially corrected in waveform, from the output of the subtraction means, is compared with the generated pilot, and the algebraic difference is determined and delivered in a negative-feedback circuit to the gain control lead of the variable gain device. Thus the received pilot is corrected substantially to its original waveform as transmitted, and the signal accompanying the pilot and occupying the same frequency band is therefore also substantially corrected to its original waveform. The pilot is eliminated by sampling and reconstruction means from the corrected signal plus pilot, and the corrected signal is delivered substantially free from waveform distortion and from the pilot. It is assumed that the transmission path is substantially free from noise and operates at a substantially constant gain.

DETAILED DESCRIPTION OF THE INVENTION

Figure 1:
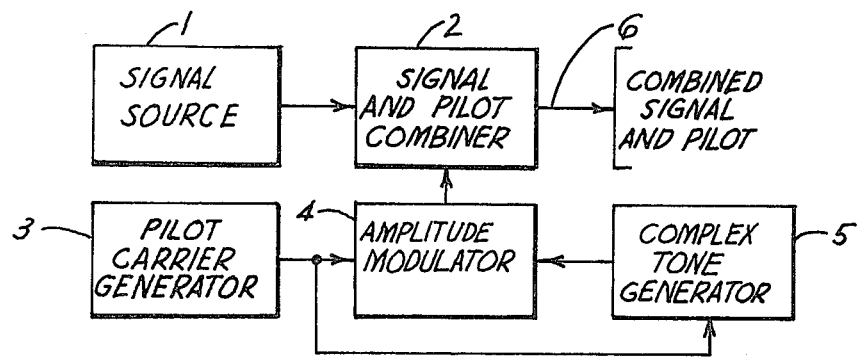
FIG. 1 shows a simplified block schematic diagram of transmitting apparatus according to the invention.

This invention is based on theorems as follows:

(1) When a continuous band-limited function occupying a selected frequency band is sampled at regularly-occurring intervals of time for short periods at a frequency greater than the minimum sampling or Nyquist frequency for the selected frequency band, the Nyquist frequency being a well-known function, with discontinuous derivatives, of the bandwidth and the highest frequency of the selected frequency band, varying between one and four bandwidths, the resultant sequence of samples fully defines the continuous band-limited function. A well-known theorem gives the range of the Nyquist function as two to four bandwidths and an extension, stated in U.S. Pat. No. 4,178,553 class 325/487.000, granted Dec. 11, 1979 to Fisher et al, extends the range from one to two bandwidths for functions which represent double-sideband amplitude-modulated waves.

(2) When the sequence of samples of paragraph (1) above is passed through a reconstruction filter, with the pass-band the same as the selected frequency band, an analog replica of the continuous band-limited function is reconstructed, differing from the original only by an amplitude factor and by the delay and frequency distortion of the filter. The replica is independent of the actual instants of sampling, as long as these instants occur at regular intervals of time with greater than the minimum or Nyquist frequency. This is a well-known theorem.

(3) We have discovered an exception to the theorems of paragraphs (1) and (2) above, as follows. When the selected frequency band contains a given periodic function, such as a sine wave or an amplitude-modulated sine wave, with regularly-occurring zero-crossings at a frequency greater than the minimum sampling or Nyquist frequency for the selected frequency band, and all instants of sampling occur at some or all of such zero-crossings of the given periodic function, then the resultant sequence of samples contains no components of the given periodic function, and when the sampled wave is passed through a reconstruction filter with a pass-band the same as the selected frequency band, an analog replica of the continuous band-limited function is reconstructed, differing from the original only by an amplitude factor, the delay and frequency distortion of the reconstruction filter, and the substantial elimination of the given periodic function. The proof of this theorem is self-evident, as the continuous band-limited function is fully defined by the samples taken at a frequency greater than its minimum sampling or Nyquist frequency and each of the samples has been taken at an instant of zero-crossing of the given periodic function. The theorem is seen to be true even when the duration of a sampling pulse is a substantial portion of the period of the given periodic function, as long as each sampling pulse is centered on an instant of zero-crossing.

(4) When the selected frequency band containing a given periodic function is sampled at a frequency greater than the minimum sampling or Nyquist frequency, alternatively in the vicinity of instants of positive and negative peaks of the given periodic function, the resultant sequence of samples when reconstructed provides a replica of all waves in the selected frequency band. This is obvious from the theorem of paragraph (2) above.

(5) If the sampling frequency and the duration of pulses are the same in the apparatus of paragraphs (3) and (4) above, and if the same reconstruction filter or identical reconstruction filters are used in the apparatus of each paragraph, and if one sequence of samples is reversed in polarity from the other, then the combined reconstructed replicas at the output of the filter or filters contain only the given periodic wave, free from other waves in the selected frequency band, since the principle of superposition applies. This is seen more readily when each sample sequence is produced by separate identical sampling means and is reconstructed in separate identical filter means, and the filter means outputs are combined in opposition.

FIG. 1 shows a simplified block schematic diagram of transmitting apparatus according to the invention. A signal source provides a signal which is a band-limited function occupying a signal frequency band, which has an arithmetic center frequency greater than its bandwidth and more than one-half the Nyquist frequency for the signal frequency band. The signal is delivered to a first input of linear combiner 2 which adds the signal to a pilot received at a second combiner input, and delivers the combined signal and pilot to output lead 6. A pilot carrier generator 3 delivers a sine wave of substantially constant amplitude and frequency, with a frequency approximately equal to the arithmetic center frequency of the signal frequency band, to amplitude modulator 4 and complex tone generator 5. Generator 5 produces a complex tone, derived in frequency and phase from the pilot carrier. Such a device is well known in the prior art. The complex tone from generator 5 is delivered to double-sideband amplitude modulator 4 where it modulates the carrier from generator 3 to produce a modulated wave centered on and extending over substantially the entire signal frequency band. The modulated carrier is delivered to the second input of combiner 2.

The apparatus of FIG. 1 functions as follows. The limitation on the position of the signal frequency band in the spectrum is readily met in practice, and is chosen to permit distortionless modulation of the pilot carrier and to facilitate reception of the signal. For example, the signal may be the upper sideband of a carrier at 4 kHz, modulated by a speech wave of 300 to 3300 Hz, which extends from 4.3 to 7.3 kHz, with an arithmetic center frequency of 5.8 kHz and a Nyquist frequency of 7.3 kHz. The pilot carrier frequency may then be 5.8 kHz, and the complex tone, derived by frequency division and harmonic generation from the 5.8 kHz carrier, may be 290 Hz plus all harmonics at intervals of 290 Hz up to 1450 Hz. Then the pilot, which is the carrier at 5.8 kHz modulated by the complex wave, has components preferably substantially equal in amplitude, spaced at 290 Hz intervals from 4.35 kHz to 7.25 kHz, extending substantially across the entire signal frequency band. The frequency, amplitude and phase of the pilot is determined by the frequency and phase of the pilot carrier.

Figure 2:
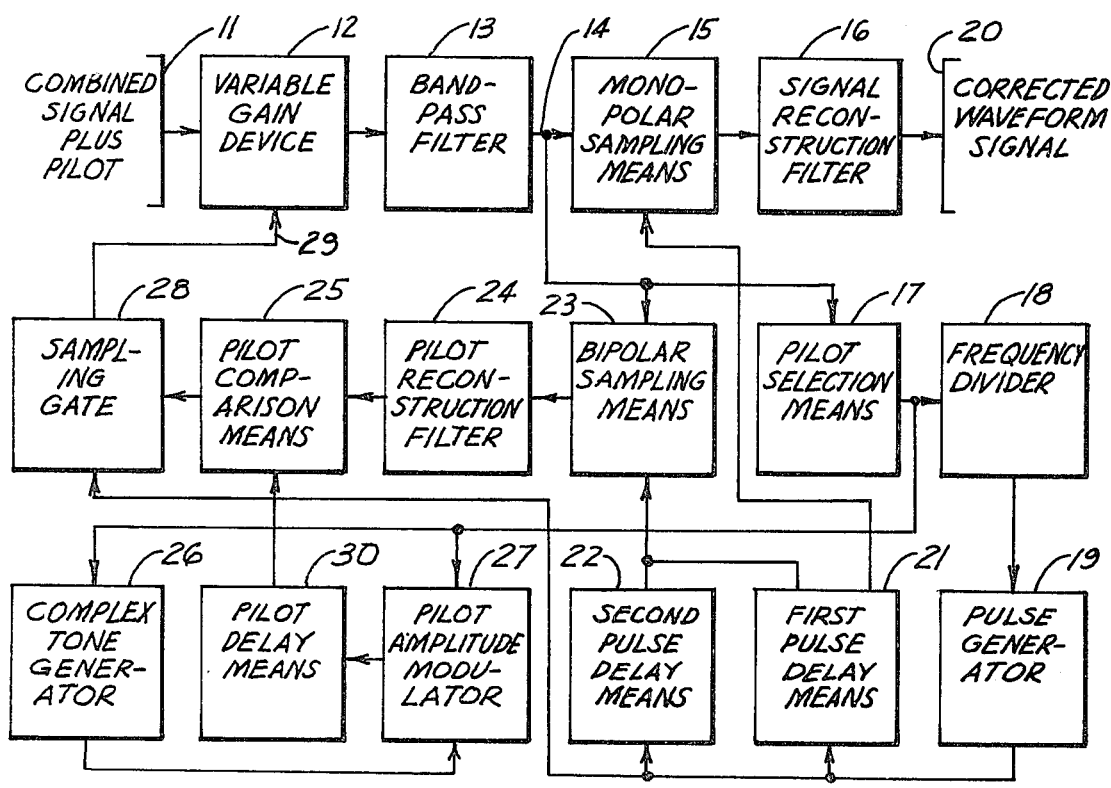
FIG. 2 shows a simplified block schematic diagram of receiving apparatus according to the invention, which uses sampling and reconstruction means to subtract the signal from the signal plus pilot.

FIG. 2 shows a simplified block schematic diagram of receiving apparatus according to the invention. A combined signal and pilot, each occupying the signal frequency band, as produced by the transmitting apparatus of FIG. 1, appear on lead 11. The combined wave consists of the signal, plus a pilot made up of a pilot carrier approximately centered in frequency on the signal frequency band, double-sideband amplitude modulated by a complex wave, so that the pilot has equal amplitude components related in frequency and phase to the carrier at equal frequency intervals across the signal frequency band. Differently expressed, the pilot as transmitted has a known waveform derivable from the pilot carrier. The received combined signal and pilot on lead 11 are delivered through variable-gain device 12 to band-pass filter and over lead 14 to monopolar sampling means 15, bipolar sampling means 23 and to pilot carrier selection means 17.

Variable gain device 12 has its gain changed, preferably in a substantially linear manner, by control voltage applied on control lead 29. Devices of this type of several designs are well known in the prior art, for example in syllabic compandors. For the present invention device 12 must be able to change gain at a rate comparable to the Nyquist frequency of the signal band.

Pilot carrier selection means 17 uses one or more of selectivity, amplitude limiting and oscillator synchronization to produce the pilot carrier substantially free from sidebands and the signal, and delivers it to amplitude modulator 27, complex tone generator 26 and frequency divider 18, which produces a sampling frequency, delivered to pulse generator 19, which produces from the sampling frequency a sequence of regularly-occurring short pulses at a frequency greater than the Nyquist frequency of the signal frequency band, having a repetition frequency equal to twice the pilot carrier frequency divided by an odd integer. The output of pulse generator 19 is delivered to first pulse delay means 21, which delivers gating pulses of a first polarity at instants of zero-crossings of the pilot carrier on lead 14 to monopolar sampling gate 15 and bipolar sampling gate 23. Pulse generator 19 also delivers gating pulses to sampling gate 18, and to second pulse delay means 22, which delivers gating pulses of a second polarity at instants alternately near instants of positive and negative peaks of the pilot carrier on lead 14, to bipolar sampling gate 23.

Complex tone generator 26 and amplitude modulator 27, using carrier supplied from selector 17 produce a double-sideband amplitude-modulated pilot identical to the pilot produced in the transmitting apparatus of FIG. 1, and deliver it through pilot delay means 30 to a first input of pilot comparison means 25. The output of bipolar sampling gate 23 comprises two separate sequences of samples of the pilot and signal combined, which when reconstructed as already explained, in a band-pass filter passing the signal frequency band, such as pilot reconstruction filter 24, produce the pilot as received with waveform distortion, free from signal, and deliver it to the second input of pilot comparison means 25. Pilot delay means 30 delays the carrier from pilot amplitude modulator 27 to approximately the same phase as the carrier from pilot reconstruction filter 24. Pilot comparison means 25 then compares the pilots from the two sources, and delivers to sampling gate 28 the difference between the pilots. The difference wave is sampled in gate 28 at a frequency greater than the Nyquist frequency for the signal frequency band, and the samples are extended to the width of the sample spacing, by well-known means and are delivered to control lead 29 of device 12. When the pilot from filter 24 is greater in amplitude than the pilot from delay means 25 at the instant of sampling, a pulse of a first polarity results and the gain of device 12 is decreased. When the pilot from filter 24 is less in amplitude than the pilot from delay means 25 at the instant of sampling, a pulse of a second polarity results and the gain of device 12 is increased. Equilibrium is readily established, as a negative-feedback loop is formed by device 12, filter 13, gate 23, filter 24, comparison means 25, gate 28 and control lead 29.

The output of monopolar sampling gate 15 is a sequence of signal pulses substantially free from pilot components, which is reconstructed in signal reconstruction filter 16, which delivers the signal substantially corrected in waveform and free from the pilot on lead 20.

In FIG. 2 bipolar sampling gate 23, with two sources of sequences of delayed sampling pulses, and pilot reconstruction filter 24 constitutes means for effectively subtracting the reconstructed signal from the reconstructed signal plus pilot, in order to obtain the pilot substantially free from the signal. An alternate means of performing this same subtraction is a simple linear subtraction means having at one input the signal from lead 20 and at the other input the signal plus pilot from lead 14, with obvious means added for correction of delay, level and frequency response of the two input waves to the subtraction means.

We claim:

1. A continuous automatic waveform correction system, comprising transmitting apparatus which combines a signal with a periodic pilot extending substantially across the frequency band of said signal, and receiving apparatus which requires said combined signal with waveform distortion, and substantially corrects said waveform distortion in variable gain means, adjusted in gain by comparison means which compares said pilot as received and separated by subtraction means from said signal, with a pilot generated in said receiving apparatus from the carrier of said pilot transmitted from said transmitting apparatus, and pilot elimination means which substantially eliminates said pilot from said signal after said waveform distortion correction in said signal after said waveform distortion correction in said variable gain means, and delivers said signal substantially free from said waveform distortion and from said pilot to an external circuit.

2. A continuous waveform correction system according to claim 1, which comprises:
 a signal source, which provides a signal in a signal frequency band which has an arithmetic center frequency greater than the band-width of said signal frequency band and greater than one-half the minimum sampling or Nyquist frequency of said signal frequency band, and
 a pilot carrier generator, which generates a substantially constant-frequency and constant-amplitude sine-wave carrier at a frequency substantially equal to said arithmetic center frequency of said signal frequency band, and
 first complex tone generator, which receives the output of said pilot carrier generator, and from it generates a complex tone which double-sideband amplitude modulates said carrier in a first amplitude modulator to produce a pilot of which the sidebands extend substantially across said signal frequency band, and
 combiner means, which receives and combines said signal and said pilot, and
 signal transmission means, which receives said signal and said pilot and transmits said signal and said pilot with some waveform distortion, and
 variable gain means, which receives said signal and said pilot with some distortion from said signal transmission means, and
 band-pass filter means, which receives the output of said variable gain means and which has a pass-band substantially equal to said signal frequency band, and
 monopolar sampling means, which receives the output of said band-pass filter means and samples it for short periods at instants of zero-crossings of said pilot at the input to said monopolar sampling means, at a frequency greater than the minimum sampling or Nyquist frequency of said signal frequency band, and
 signal reconstruction filter means, which has a pass-band substantially the same as said signal frequency band, receives the output of said monopolar sampling means and from it reconstructs said signal substantially free from said pilot, and delivers said signal to an external circuit, and
 pilot carrier selection means, which receives the output of said band-pass filter means and which selects the carrier of said pilot, by at least one of selectivity, amplitude limiting and oscillator synchronizing means, and produces said carrier substantially free from said sidebands and from said signal, and
 frequency divider means, which receives the output of said pilot carrier selection means and divides said carrier frequency to produce a sampling wave frequency, and
 pulse generator means, which receives said sampling wave from said frequency divider means and from it produces a sequence of regularly-occuring short pulses with a pulse repetition frequency greater than the minimum sampling or Nyquist frequency of said signal frequency band and equal to twice said pilot carrier frequency divided by an odd integer, and
 first pulse delay means, which receives the output of said pulse generator means and delivers a first sequence of regularly-occurring short pulses of a first polarity, at instants of zero-crossings of said pilot carrier at the output from said band-pass filter means to said monopolar sampling means, and
 second pulse delay means which receives the output of said pulse generator means and delivers a second sequence of regularly-occurring short pulses of a second polarity, at instants near alternate positive and negative peaks of said pilot carrier at the output of said band-pass filter means, and
 bipolar sampling means, which receives as gating pulses said first sequence of pulses from said first pulse delay means and said second sequence of pulses from said second pulse delay means, and receives as input the output of said band-pass filter means, and samples said input to produce a first sequence of samples of said input of a first polarity and a second sequence of samples of said input of a second polarity, and
 pilot reconstruction filter means, which receives the output of said bipolar sampling means, and reconstructs said first sequence of samples to produce a first analog replica of said input substantially free from said pilot, of a first polarity, and reconstructs said second sequence of samples to produce a second analog replica of said input, of a second polarity, and combines said first and said second analog replicas to produce a replica of said pilot substantially free from said signal, and second complex tone generator means, which receives the input of said frequency divider, and from it generates a complex tone which double-sideband amplitude modulates said carrier in a second pilot amplitude modulator to produce an output of which the sidebands extend substantially across said signal frequency band, and which is substantially identical to the output of said first amplitude modulator, and pilot delay means, which receives the output of said second pilot amplitude modulator, and delays said output to substantially the same phase as the output of said pilot reconstruction filter means, and pilot comparison means, which receives the output of said pilot reconstruction filter means at a first input, and receives the output of said pilot delay means at a second input, and delivers the difference in amplitude at each instant of the waves at each input to an output circuit, and sampling gate means which receives as input the output of said pilot comparison means, and receives as gating pulses the output of said pulse generator means, and delivers a sequence of samples of said input to said gain means when the output of said pilot reconstruction filter is different from the output of said pilot delay means at the instant of each pulse from said pulse generator means.

* * * * *